April 28, 1953 E. B. McGEE 2,636,673
AERIAL DEAD RECKONING TRUE PLOTTING NAVIGATOR
Filed Jan. 23, 1952 3 Sheets-Sheet 1

INVENTOR.
Elbert B. McGee,
BY Victor J. Evans + Co.
ATTORNEYS

April 28, 1953      E. B. McGEE      2,636,673
AERIAL DEAD RECKONING TRUE PLOTTING NAVIGATOR
Filed Jan. 23, 1952      3 Sheets-Sheet 2
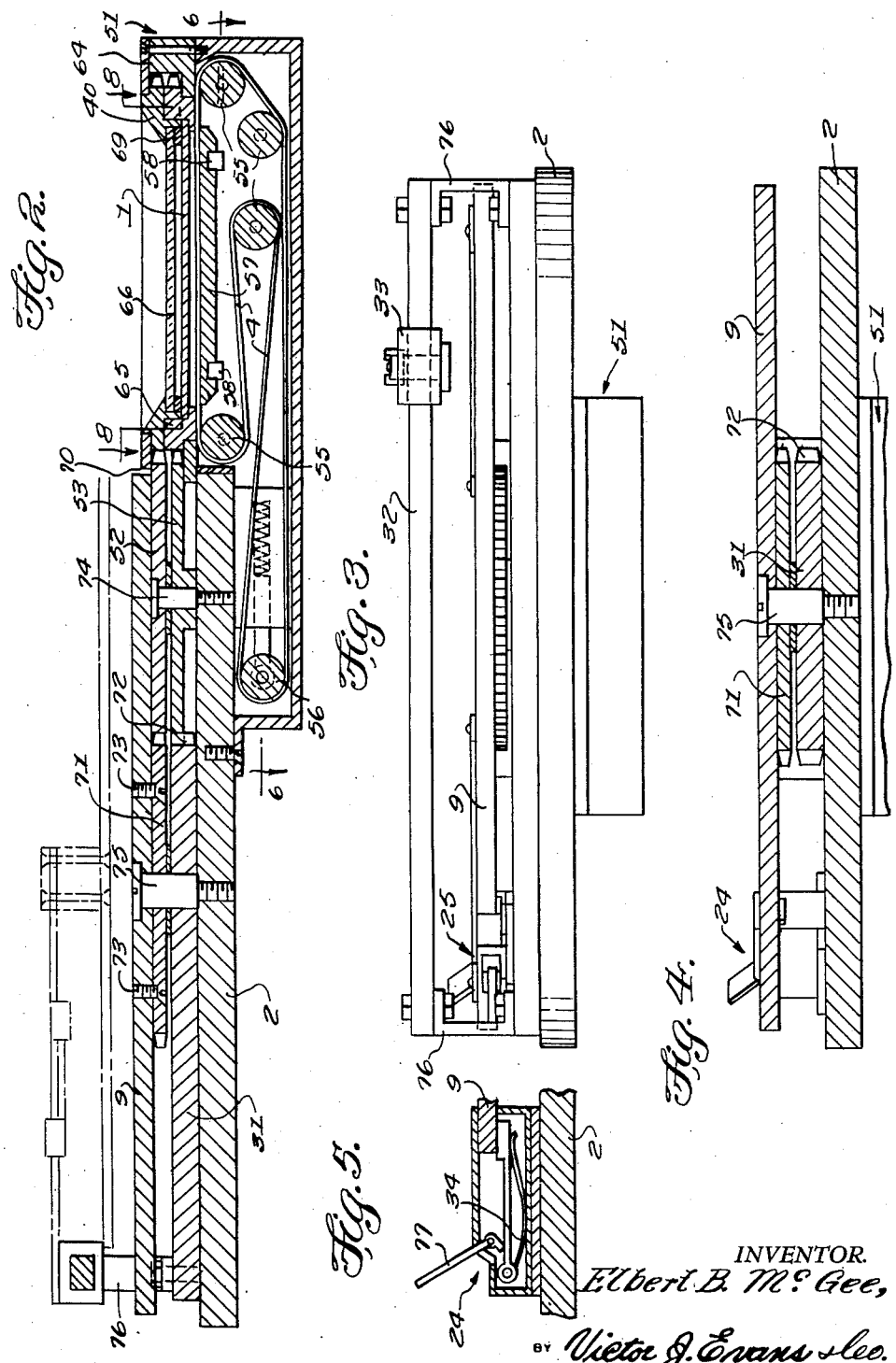
INVENTOR.
*Elbert B. McGee,*
BY *Victor J. Evans & Co.*
ATTORNEYS April 28, 1953        E. B. McGEE        2,636,673
AERIAL DEAD RECKONING TRUE PLOTTING NAVIGATOR
Filed Jan. 23, 1952        3 Sheets-Sheet 3
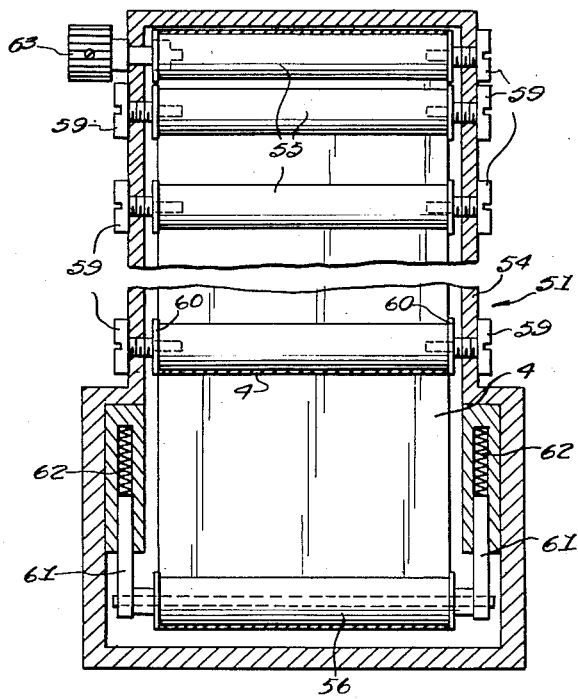
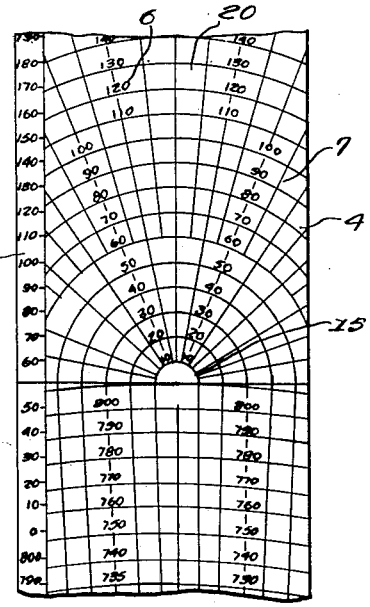
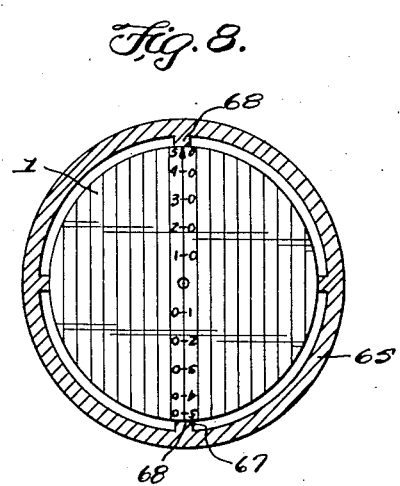
INVENTOR.
Elbert B. McGee,
BY Victor J. Evans & Co.
ATTORNEYS

Patented Apr. 28, 1953

2,636,673

UNITED STATES PATENT OFFICE 2,636,673

AERIAL DEAD RECKONING TRUE PLOTTING NAVIGATOR

Elbert B. McGee, Fair Oaks, Calif.

Application January 23, 1952, Serial No. 267,752

2 Claims. (Cl. 235—61)

This invention relates to a navigation instrument, and more particularly to a nevigation instrument for use by pilots directing flight of aircraft.

The object of the invention is to provide a navigation instrument which is constructed so that a pilot or other person can azimuth or measure the direction and distance between any two points on the exposed portion of a chart, the method of the present invention being accurate and precise.

Another object of the invention is to provide a navigation instrument which is constructed so that when making calculations on a chart, it is not necessary to raise up the chart or have an opening in the center of the chart to read speed scales and other data.

Still another object of the invention is to provide a navigation instrument that includes a window in which true air speed is always set and read, so that the operator will not be confused, the method and apparatus of the present invention embodying the placing of a folded chart on a plotting table, and wherein any leg of flight on the chart can be exposed at will.

It is another object of the invention to provide a navigation instrument which can be used for solving various problems, such as wind problems and controlling a plotting table, as well as true headings, magnetic headings corrected for variations, and drift angles, true air speeds, ground speeds and various other problems such as those enumerated in my copending application, filed January 23, 1952, Serial No. 267,753.

Other objects and advantages will be apparent during the course of the following description.

In the accompanying drawings forming a part of this application, and in which like numerals are used to designate like parts throughout the same;

Figure 2 is a sectional view taken on the line 2—2 of Figure 1;

Figure 3 is a side elevational view of the navigation instrument;

Figure 4 is a sectional view taken on the line 4—4 of Figure 1;

Figure 5 is a sectional view taken on the line 5—5 of Figure 1;

Figure 6 is a sectional view taken on the line 6—6 of Figure 2;

Figure 7 is a top plan view of the speed scale or card;

Figure 8 is a sectional view taken on the line 8—8 of Figure 2.

Figure 1:
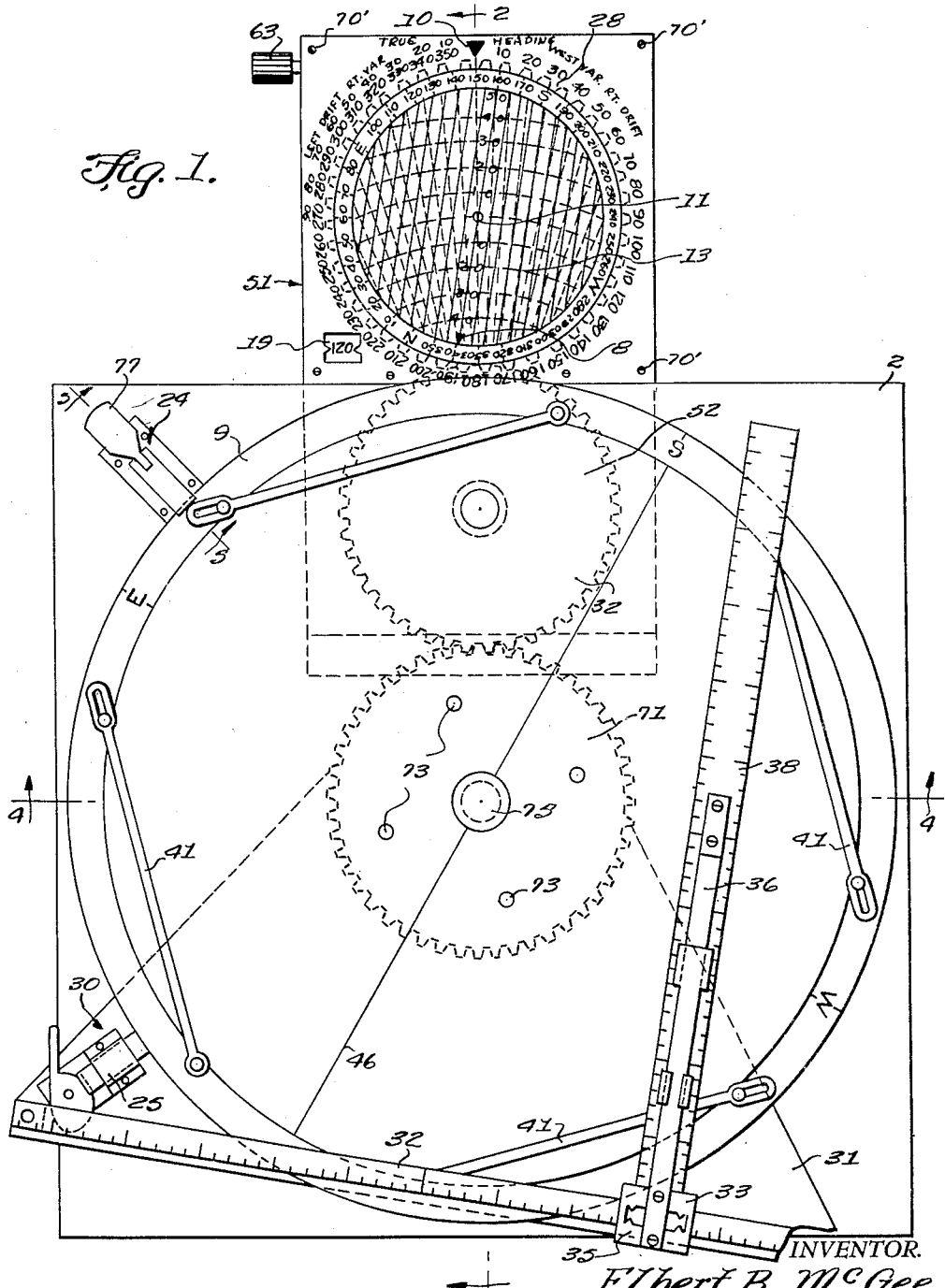
Figure 1 is a top plan view of the navigation instrument constructed according to the present invention.

Referring in detail to the drawings, the navigation instrument of the present invention includes two individual units. Thus, there is provided a base 2 upon which a plotting table assembly 30 is rotatably mounted, and the plotting table assembly 30 is coordinated to the computing assembly 51 by means of transfer gears 52 and 53. The computing assembly 51 is attached to the top end of the base 2, Figure 1, and this arrangement is advantageous over the arrangement shown in my copending application, since it is not necessary to disturb the map that is arranged on the plotting table 9 in order to make computations, because the speed scales and wind vector can always be seen.

The computing assembly 51 is built on a base 54, and arranged in the base 54 are a plurality of rollers 55. A sliding speed scale 4 is also arranged in the base 54, and the speed scale 4 is in the form of an endless roll, Figure 2. Each of the rollers is mounted on screws 59, and shims 60 are arranged on the screws, so that by moving the shims 60 from one end of the roller to the other, the speed scale 4 can be lined up to run true under the center 11.

A tension roller 56 is provided, and the tension roller 56 is mounted on arms 51, the arms 51 being biased or urged out of guide members in which are positioned springs 62, so that a tension is always maintained on the speed scale 4. The top roller 55 is the drive roller, and a drive shaft assembly 63 is operatively connected to this drive roller.

As previously stated, the speed scale 4 is mounted on the rollers, and the scale 4 has to be long enough to cover high speeds as well as low speeds. In Figure 7 there is shown a portion of the speed scale 4 which includes drift angle lines 6 that run lengthwise of the scale from a common center 15. There is also provided a plurality of concentric circles 7 which radiate from the common center 15, and the concentric circles 7 are graduated and indexed by a series of scales 20 each side of center line along drift angle lines 6 to units that correspond to the speed scales. An air speed window 19 is provided, so that the operator can view the air speed scale 19' on the element 4. The window 19 through which the air speed scale 19' is always set and read helps to eliminate confusion on the part of the operator, since the ground speed will be read only on the face of the dial under the tail of the wind vector 13 in the concentric circles 7 in reference to the center scales 20. However, air speed can be read at center 11 if desired. The air speed scale 19', Fig. 7, is, as will be seen from the drawings, spaced and indexed to the same scale of units as the center scales 20, the indexing starting at the amount of units that the air speed window 19 is below the center 11.

Arranged beneath the top of the computing assembly 51 is a plate or bridge 57, and the bridge 57 is supported or engaged by lugs or clips 58. The bridge 57 helps to insure that the speed scale 4 always stays up against the bottom of the course indicator paralleling disc 1.

A face mounting plate 64, Figure 2, is arranged on the base 54, and a ring gear 65 is positioned in the plate 64. The ring gear 65 is machined or shaped to a close fit so that it bears against the inner circumference of the face mounting plate 64.

Arranged in the course indicator ring gear 65 is the course indicator paralleling disc 1 which is provided with notches 67 that are arranged in alignment with lugs 68 that are on the inside circumference of the ring gear 65. Placed on top of the course indicator paralleling disc 1 and the ring gear 65 is an azimuth ring gear 40 in which is installed a wind plotting disc 66. The wind plotting disc 66 is transparent and also has notches that receive lugs on the bottom of the azimuth ring gear 40. The disc 1 and disc 66 are maintained in their proper spaced-apart relation by means of a spacer ring 69.

Arranged over the mounting plate 64 is a face plate 70, and the face plate 70 is secured in position by means of screws 70', Figure 1. By having the course indicator disc 1 and wind plotting disc 66 held in place by means of the ring gears 40 and 65, and by means of the spacer ring 69, the discs can be moved independently of each other and yet arranged close enough to each other to insure a high degree of accuracy, and also still permit the discs to be readily changed in the event the discs become dirty or cloudy.

Face plate 70 is provided with a heading index 28 which is matched to the outside circumference of the azimuth scale 40, and the index 28 is graduated 360° from true heading indicator 10 and at least 45° anticlockwise. As shown or seen in Figure 2, the azimuth scale 40 is tapered or arranged on an angle to insure that the course indicator 8 and the heading index 28 are both close enough to the azimuth scale to eliminate any error in reading.

The computing assembly 51 must at all times be in perfect coordination with the plotting table assembly. That is, the course indicator paralleling lines on disc 1 must at all times be absolutely parallel to the true plotting scale 38, and the azimuth scale 40 must at all times be in perfect coordination and parallel to the plotting table 9. In the present invention this is accomplished as follows: The true plotting assembly 30 is placed on the base 2, and the true plotting assembly 30 consists of a true plotting plate 31, a cross slide bar 32, plotting scales assembly 33, and plotting transfer gear 53. The plotting plate 31 is provided with a plurality of gear teeth which are arranged as a half-gear 72, Figure 4. This half-gear 72 has the same amount of teeth to the inch as the ring gear 65. The transfer gear 53, which has the same amount of teeth to the inch as the half-gear 72, is arranged so that its teeth mesh with the true plotting assembly 30 and course paralleling disc 1.

The plotting table 9 is also coordinated and includes a drive gear 71 which is connected to the under surface of the plotting table 9 by means of suitable securing means, such as screws 73. The drive gear 71 has the same amount of teeth as the azimuth ring gear 40. The transfer gear 52 which has the same amount of teeth to the inch as the plotting table gear 71 and azimuth ring gear 40 is placed on top of the transfer gear 53 so that its teeth mesh with the azimuth ring gear. A bolt 74 is provided for holding the transfer gears 52 and 53 in their proper position.

The plotting table and drive gear 72 are arranged contiguous to the plotting assembly 30, and the drive gear 72 is arranged in meshing engagement with the transfer gear 53, so that the plotting table north and south line 46 is parallel to and in the same order as the north and south of the azimuth scale. A bolt 75 extends through the plotting table and into the base 2, the bolt 75 being countersunk flush with the top of the plotting table to provide a smooth surface. Thus, it will be seen that as long as the drive gears 71 and 72 are the same size and have the same number of teeth as the ring gears 65 and 40, the computing assembly 51 can control a plotting table of any size desired. By using transfer gears 52 and 53 that have the same amount of teeth to the inch, the two units will be coordinated.

Attached to the true plotting plate 31 is the cross slide bar 32, the bar 32 being attached by means of clips 76. The cross slide bar 32 is graduated to a scale of units that are the same scale as the maps being used for navigation. The plotting scale 38 is attached to cross slide bar 32 by means of a slide spring arm 36 which permits sliding movement of the plotting scale 38 for at least five units. The plotting scale 38 is attached to a saddle 35 that fits over the cross bar 32. There is further provided a heading lock 24 which is mounted on the base 2, and this serves to lock the plotting table to the base 2 to insure that true headings are always read in reference to the heading indicator 10 and the azimuth scale 40. A spring lock arm 34 serves to maintain the plotting table 9 in locked position until pressure is applied to the lock release arm 77. When the lock 24 is in unlocked position, it will stay in this position until manually moved.

A course lock 25 is provided, and this course lock 25 serves to lock the plotting assembly 30 to the plotting table 9. This enables or insures that the true course will always be read relative to the north and south line of the plotted table 9, or to the particular line of longitude of the chart that is placed parallel to the north and south line of the plotting table 9.

As previously stated, the method of the present invention comprises the placing of a chart on a plotting table so that the line of meridian that is being used as a reference for any particular course leg permits the chart to be easily moved at will. The chart is held on the plotting table by means of spring clips 41 which are each provided with a slot on one end to permit movement so that the middle of the spring clips can be raised, whereby the corners of any standard navigation map can be inserted thereunder, the map being folded in such a manner that any leg of flight is exposed to the operator at will.

From the foregoing it is apparent that a navigation instrument has been provided which is fast, accurate and compact so that it can be used in high speed aircraft, and wherein mental calculations are eliminated. Also, the instrument of the present invention can be used by laymen in every-day problems of flying, and also a private pilot can find much use for the instrument. It has been seen that the invention comprises the placing of a group of parallel lines over a group of lines that radiate outwardly from a common center. Then, regardless of what position the groups are placed in relation to each other, it is only possible for one of the radiating lines at a time to be parallel to a group of parallel lines. The parallel lines represent the course, and the radiating lines represent the drift in relation to true air speed and wind direction and velocity, so that by arranging these units as previously described, any problems can be solved. Then, these solutions are applied directly to the chart or compass. That is, to solve any wind problem, the group of parallel lines on the disc 1 are arranged parallel to the only radiating line or disc line that is under the tail of the wind vector. This automatically and instantaneously coordinates the plotting table to the true headings and plotting assembly to true course or track.

According to the method of the present invention, a chart is placed on the plotting table 9, so that the line of meridian that is being used for any leg of a course is parallel to the north and south line of the plotting table 9. This is accomplished in the following manner: The course lock 25 and heading lock 24 are released. Then the plotting table 9 is rotated until the heading is north which is read at the heading indicator 10. Next, the heading lock 24 is locked, and the plotting assembly 30 is centered, and then the course lock 25 is locked. Next, the chart is placed on the plotting table with the north of the map in alignment with the north of the plotting table 9, the edges of the chart being placed under spring clips 41. Any standard aeronautical chart can be used and folded so that its corners will come within the circumference of the plotting table, so that any portion of the intended course will be exposed at will. Next the plotting scale 38 is slid over the chart on the cross slide bar 32 until the plotting scale 38 is alongside the line of meridian that is being used as a reference. Then, the operator manipulates the chart around under the spring clips 41 until the line of meridian is parallel to the plotting scale. Then, the heading lock 24 and the course lock 25 are released by revolving the plotting table 9 and moving the plotting table scale 38, it is possible to azimuth and measure the direction and distance between any two points on the exposed portion of the chart. The azimuth is read at course indicator 8 and compass rose 40.

Various types of problems can be solved with the instrument of the present invention, and these problems are described in detail in my copending application. However, such problems as solving for true heading, ground speed and plotting the progress off course can be solved when the wind direction and course, true air speed, time and intended course are known. Also, course problems, drift problems and the like can be solved, with facility. By using the method of the present invention, a navigator can plot any radius of action or interception problem directly to the chart or to the surface of the plotting table, if desired.

What is claimed is:

1. In a navigation instrument, a base, a plotting table arranged contiguous to said base, a plotting plate interposed between said table and base, and a computing assembly operatively connected to said base, a crossbar arranged above said table, and a plotting scale slidably connected to said crossbar, said computing assembly comprising a base, a plurality of rollers arranged in said last-named base, a speed scale trained over said rollers, and a drive mechanism operatively connected to one of said rollers, there being a window for permitting observation of the indicia on said speed scale, and gear means operatively connecting said computing assembly to said plate and table.

2. In a navigation instrument, a base, a plotting table arranged contiguous to said base, a plotting plate interposed between said table and base, and a computing assembly operatively connected to said base, a cross bar arranged above said table, and a plotting scale connected to said cross bar, said computing assembly comprising a base, a plurality of rollers arranged in said last named base, a speed scale trained over said rollers, and a drive mechanism operatively connected to one of said rollers, means for permitting observation of the indicia on said speed scale, and means operatively connecting said computing assembly to said plate and table.

ELBERT B. McGEE.

References Cited in the file of this patent

UNITED STATES PATENTS

| Number | Name | Date |
| --- | --- | --- |
| 2,419,203 | Edwards | Apr. 22, 1947 |
| 2,420,673 | Monrad | May 20, 1947 |
| 2,438,730 | Watter | Mar. 30, 1948 |
| 2,506,299 | Isom | May 2, 1950 |